(12) United States Patent
Ricketts (10) Patent No.: US 11,851,124 B1
(45) Date of Patent: Dec. 26, 2023

(54) BICYCLE RACK (71) Applicant: Isaac Ricketts, Eagle, ID (US)

(72) Inventor: Isaac Ricketts, Eagle, ID (US)

( * ) Notice: Subject to any disclaimer, the term of this patent is extended or adjusted under 35 U.S.C. 154(b) by 0 days.

(21) Appl. No.: 17/818,409

(22) Filed: Aug. 9, 2022

(51) Int. Cl.
*B62H 3/12* (2006.01)
*B62H 3/02* (2006.01)

(52) U.S. Cl.
CPC ................ *B62H 3/12* (2013.01); *B62H 3/02* (2013.01)

(58) Field of Classification Search
CPC ... B62H 3/12; B62H 3/02; B62H 3/00; B62H 3/10; A47F 5/0807; A47F 5/0838
See application file for complete search history.

(56) References Cited

U.S. PATENT DOCUMENTS

| 3,934,436 | A  | * | 1/1976  | Candlin ................... B62H 3/02 211/5 |
| 5,294,006 | A  | * | 3/1994  | Deschino .............. A47F 5/0853 211/5 |
| 5,385,280 | A  | * | 1/1995  | Littlepage ................ B62H 3/02 224/570 |
| 5,447,241 | A  | * | 9/1995  | Bureau .................... B62H 3/02 211/5 |
| 5,553,715 | A  | * | 9/1996  | Brotz ....................... B62H 3/00 211/5 |
| 5,887,461 | A  | * | 3/1999  | Heffley .................. E05B 71/00 211/8 |
| 6,983,853 | B1 | * | 1/2006  | Fickett ...................... A47F 7/00 248/303 |
| 8,505,932 | B1 | * | 8/2013  | Piccirillo ............... B62K 27/02 280/30 |
| 8,794,493 | B2 | * | 8/2014  | Cauley ..................... B60R 9/10 224/403 |
| 9,139,243 | B1 | * | 9/2015  | Gonzalez ................. B62H 3/02 |
| 10,513,227 | B2 | * | 12/2019 | Merino ..................... B60R 9/10 |
| 10,822,045 | B1 | * | 11/2020 | Shen ........................ B62H 3/12 |
| 11,161,561 | B1 | * | 11/2021 | Gu ............................ B62H 3/12 |
| 2005/0056740 | A1 | * | 3/2005  | Chuang .................... B62H 3/12 248/176.1 |
| 2005/0184013 | A1 | * | 8/2005  | Frazeur ..................... B60R 9/10 211/18 |
| 2006/0180554 | A1 | * | 8/2006  | Lang ........................ B62H 3/12 211/18 |
| 2007/0017881 | A1 | * | 1/2007  | Aiken ...................... B62H 3/02 211/17 |

(Continued)

*Primary Examiner* — Ko H Chan
(74) *Attorney, Agent, or Firm* — Scott Swanson; Shaver & Swanson, LLP (57) ABSTRACT

A bicycle rack having two frame support prongs for supporting a tube of a bicycle frame. The frame support prongs are connected to a U-shaped tube at opposing parallel arms of the U-shaped support tube. The U-shaped support tube has a swivel support tube that is configured for swiveling engagement with a base support tube. The base support tube is connected to a base plate that is mountable on a substrate, such as a wall, vehicle, post, or other substrate. The frame support prongs are preferably removably attached to the U-Shaped support tube to allow for altering the orientation of the individual frame support prongs. The base support tube is preferably retained in the bracket by two pins positioned through the base support tube. Removal of a rearward pin allows the support frame to rotate downward into a storage position.

8 Claims, 7 Drawing Sheets

(56) References Cited

U.S. PATENT DOCUMENTS

| | | | |
|---|---|---|---|
| 2008/0272264 A1* | 11/2008 | Carlson | B62H 3/02 |
| | | | 29/897 |
| 2009/0057522 A1* | 3/2009 | Bedell/Fiore | B62H 3/12 |
| | | | 29/525.11 |
| 2015/0034573 A1* | 2/2015 | Peruzzo | A47F 5/08 |
| | | | 211/18 |
| 2017/0253188 A1* | 9/2017 | Shen | B60R 9/10 |
| 2018/0029218 A1* | 2/2018 | Epicureo | B62H 3/12 |
| 2018/0134229 A1* | 5/2018 | Shen | B60R 9/06 |

* cited by examiner

BICYCLE RACK

TECHNICAL FIELD OF THE INVENTION

The presently disclosed technology relates to a bicycle rack. More particularly, the present invention is a bicycle rack having a U-shaped support tube providing swiveling orientation of the U-shaped support tube and frame support prongs to provide a diverse array of support configurations.

BACKGROUND OF THE INVENTION

Bicycle storage devices come in a wide variety of forms and designs to meet the needs of a variety of storage situations. Bicycles to be stored on these storage devices come in a wide variety of shapes and sizes. Not all bicycle racks are compatible with every bicycle shape. This issue has been further exacerbated with the rise in popularity of electric bicycles, which often utilized a battery positioned on or within the frame of the bicycle.

Bicycles are often suspended in transport or in positioning in a person's house, such as in a garage. Preferably, bicycles are mounted out of the way. Alternatively, bicycles can be positioned on a rack in order to perform maintenance on the bicycle. What is needed is an improved bicycle rack that allows for adjustability based on the size, shape, and/or style of the bicycle to be placed on the rack.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a bicycle rack. The bicycle rack having a base bracket. The base bracket is configured for mounting to a substrate, such as a wall, post, or other supporting material. A base support tube is connected to the base bracket and extends outward from the base support bracket preferably at a perpendicular orientation to the supporting substrate, such as a wall. A U-shaped tube is attached in a swiveling configuration such that the U-shaped support tube can rotationally swivel relative to the base support tube. The U-shaped support bracket having two spaced apart parallel arms.

A tube lock is provided to rotationally arrest the swiveling rotation of the U-shaped support tube relative to the base support tube. Preferably the U-shaped support tube has a swiveling support tube extending generally in the opposite direction of the parallel arms. The swiveling support tube is configured for mating engagement with the base support tube. Preferably the tube lock is a clamping collar that clamps rotation of the swiveling support tube relative to the base support tube.

A pair of frame support prongs extends from the arms of the U-shaped support bracket. Each of the frame support prongs is attached to one of said two spaced apart parallel arms, with each of said opposing frame support prongs configured to support a tube of a bicycle frame. Preferably the prongs are configured for rotational and/or removable attachment to the arms of the U-shaped support tube.

A major benefit of the disclosed concepts are that the bike rack allows for support of a wide variety of bicycle frames. The rotational capability allows the prongs to be positioned on horizontal tubes, vertical tubes, and diagonal tubes of a bicycle frame, with the opposing prongs providing a secure mounting engagement with a bicycle frame.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF DRAWINGS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figures 1, 1A:
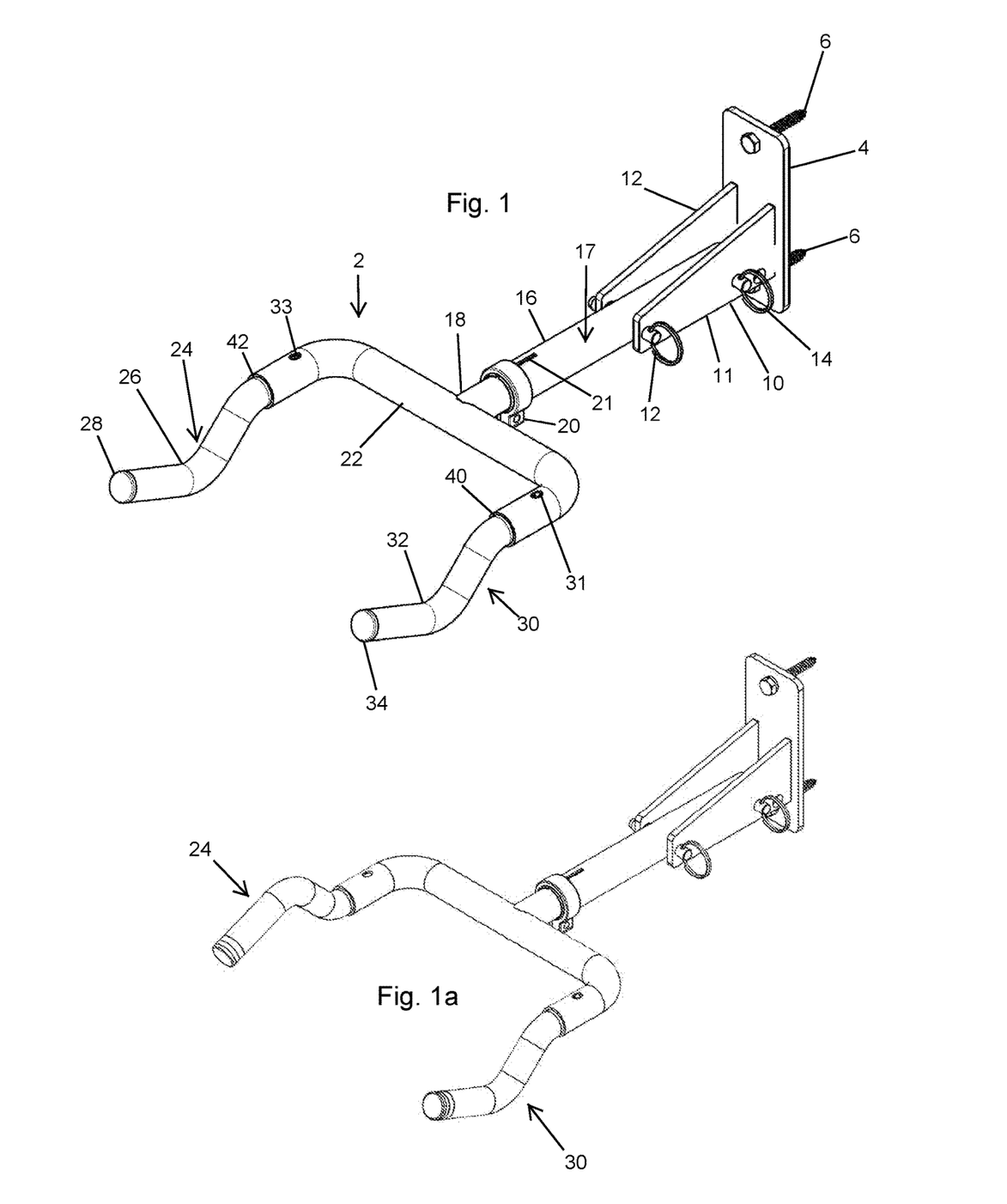
FIG. 1 is a perspective view of a bicycle rack having a U-shaped support tube in a horizontal position with each frame support prong in a parallel orientation.
FIG. 1a is a perspective view of the bicycle rack of FIG. 1 having the U-shaped support tube in a horizontal position with the frame support prongs in opposing orientation.

FIG. 1 illustrates a preferred embodiment of a bicycle rack having variability in orientation as well as in gripping position of the rack on the bicycle. The bicycle rack has a baseplate 4 that is mountable to a substrate. A variety of mechanisms can be utilized to mount the baseplate to the substrate. Depicted are two bolts 6 that are inserted through openings to affix the baseplate to a substrate, such as a wall, post, or other position on which a bicycle can be mounted. A baseplate is mounted to a bracket 10 that provides for mounting capability of base support tube 16. Base support tube 16 is retained in the bracket 10 by two pins 12, 14 that extend through a first side plate 11 and second side plate 12 of the bracket.

Figures 4, 5:
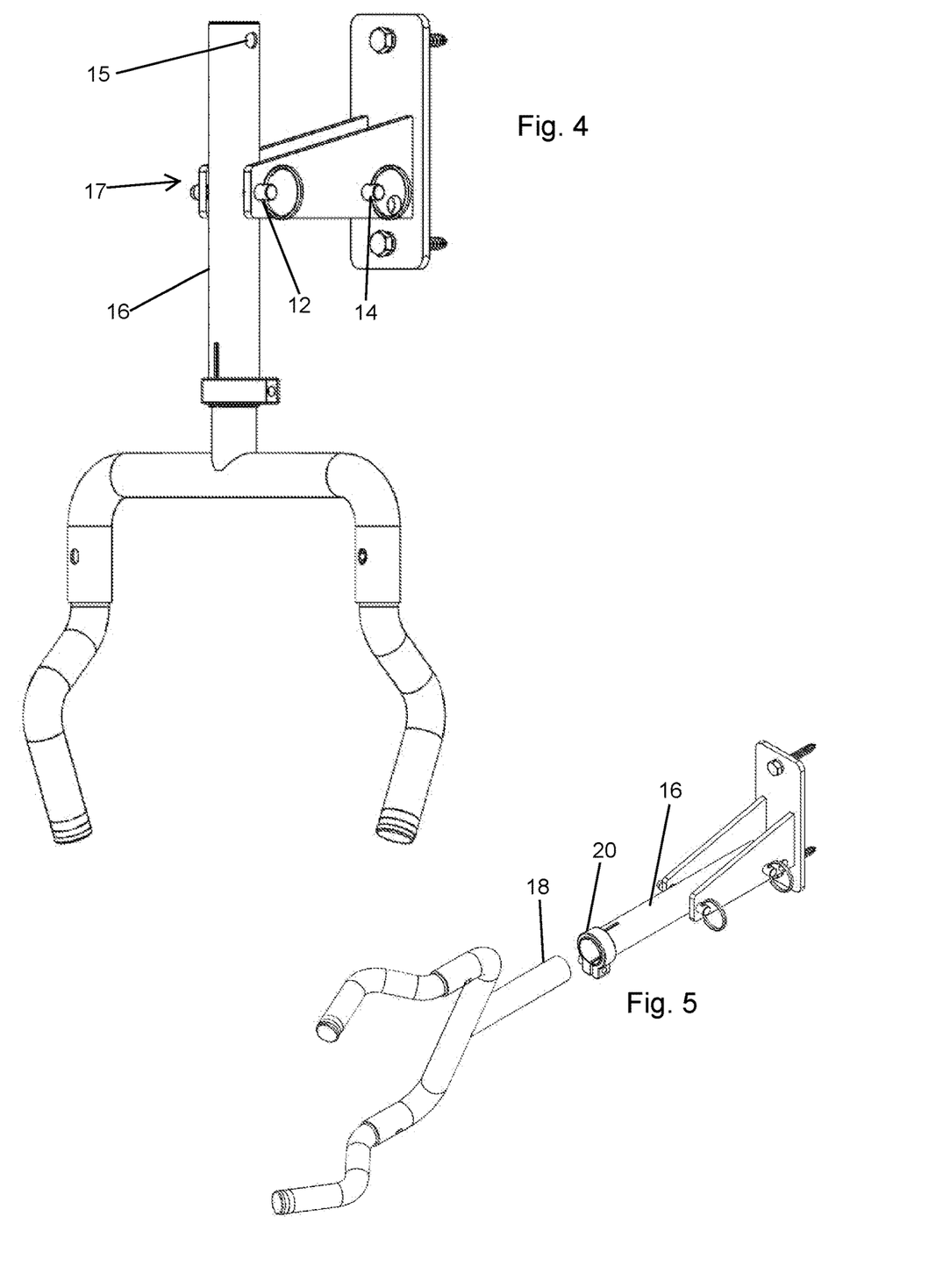
FIG. 4 is an isometric view of the bicycle rack of FIGS. 1-9 in a stored position.
FIG. 5 is a partially exploded view of the bicycle rack showing the U-shaped support tube withdrawn from the bicycle rack.

The opposing side plates 10, 12 serve as a positioning guide and structural support for the base support tube 16. The base support tube is configured such that removal of the rearward pin 14 allows for the base support tube to hinge and move downward 17, pivoting on forward pin 12. Removal of the rearward pin 14 allows for the folding of the support rack such that the frame support prongs 24, 30, U-shaped support tube 22, and base tube 16 are in a storage position in which the frame support prongs, U-shaped support tube, and base support tube are oriented in a downward direction due to gravity, as shown in FIG. 4. Two spaced apart frame support prongs 24, 30 are provided to support the bicycle tube. The spaced apart frame support prongs are connected by a U-shaped support tube, with each frame support prong inserting into an arm of the U-shaped support tube. The U-shaped support tube has a swivel support tube 18 extending from a center of the U-shaped support tube in the opposite direction of the arms of the U-shaped support tube. The swivel support tube 18 is configured for sliding positioning within the base support tube 16, and for swiveling or rotational movement with base support tube as shown in FIG. 17. A clamping collar 20 is provided to fix the swivel support tube 18 in position in base support tube 16 to fix the rotational position of the U-shaped support tube.

Each frame support prong extends to an end 28, 34. Between a first end and second end of the frame support prong is a depression 26, 34 that is constructed to retain a rounded tube of a bicycle frame. Each of the depicted frame support prongs is configured for removable attachment to the U-shaped support tube 22. Each frame support prong inserts into an opening 40, 42 in an arm the U-shaped support tube 22. A set screw 31, 33 is configured retain each of the frame support prongs in position rotationally and from sliding out of each respective arm. Alternative attachment mechanisms can be utilized to retain the frame support prongs in the arms of the U-Shaped support tube. The frame support prongs are preferably positioned in a cradling orientation and an opposite orientations. In the orientations shown in FIG. 1, each frame support prong is shown such that a generally horizontal tube of a bicycle frame can be positioned and cradled on the frame support prongs with each frame support prong in the cradling orientation. FIG. 1a illustrates the rack of FIG. 1 with one of the frame support prongs rotated or swiveled to provide an opposite orientation. This allows the weight of the bicycle frame to be supported by frame support prong 30, with frame support prong 24 preventing rotation of the frame about frame support prong 30.

Figures 2, 3:
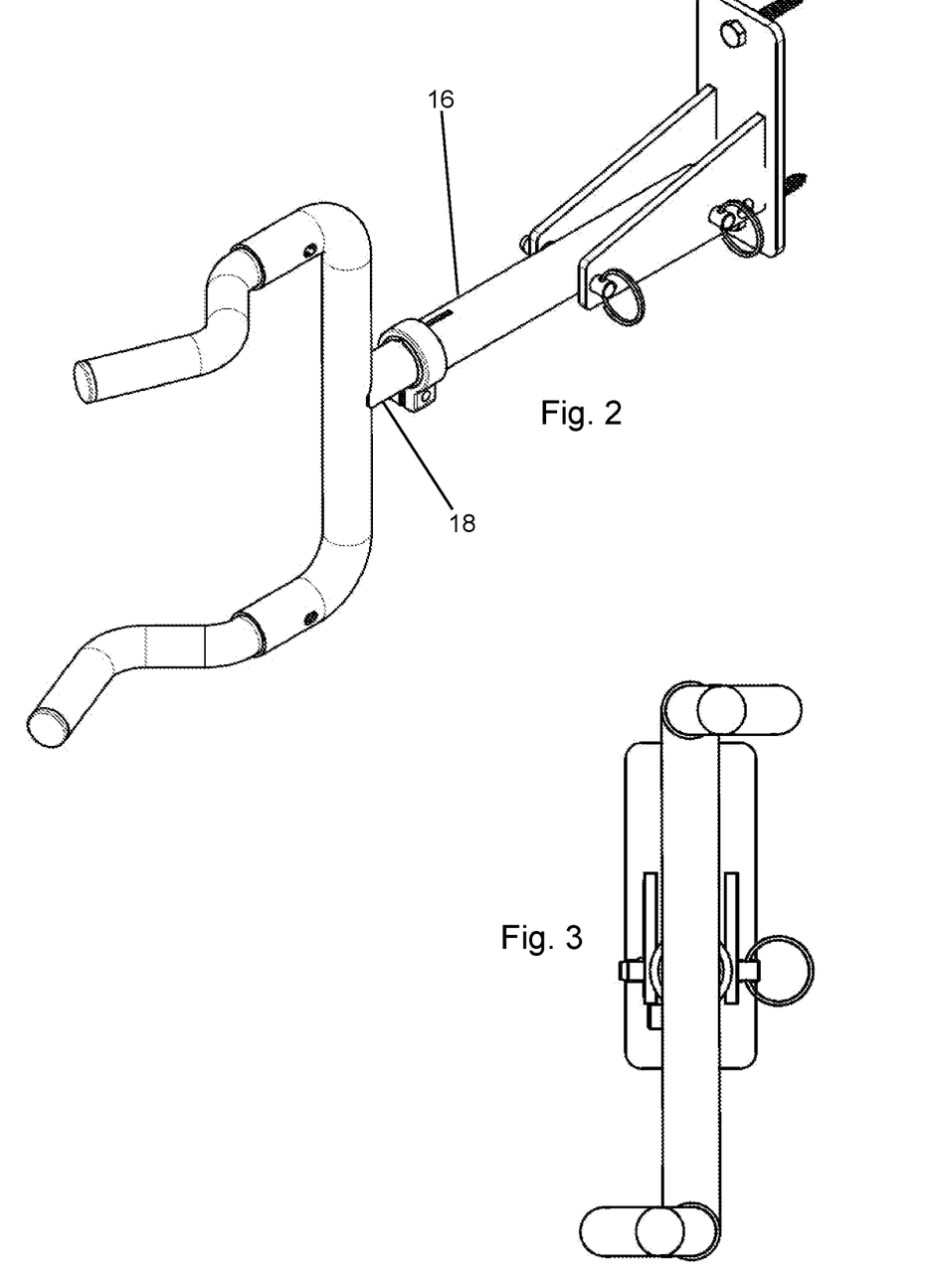
FIG. 2 is a perspective view of a bicycle rack having a U-shaped support bracket in a vertical orientation.
FIG. 3 is an isometric front view of the bicycle rack of Figure 1a having the U-shaped support tube in a vertical position.

FIG. 2 illustrates the bicycle rack of FIGS. 1-1a with the frame support prongs in opposing orientations. The swiveling support tube 18 of the U-Shaped support tube 18 has been rotated within base support tube 16 to alight the U-shaped support tube and frame support prongs in a vertical orientation. FIG. 3 provides a front view of FIG. 2 illustrating the vertical orientation.

FIG. 4 illustrates the disclosed embodiment of a bicycle rack in a storage orientation. Pin 14 has been removed through opening 15 in the main frame tube of the bicycle rack. The base support tube 16 has rotationally pivoted on pin 12. The weight of the frame support prongs and U-shaped-support-tube have caused the frame support prongs and support portion to rotate downward into a storage position.

FIG. 5 is a partially exploded view of the bicycle rack showing the U-shaped support tube having swivel support tube 18 removed from the base support tube 16. Clamping collar 20 is illustrated around the end of the base support tube. A relief 21 is positioned in the end of base support tube to allow constriction of the circumference of the opening to allow for the clamping action of the base support tube on the swiveling support tube.

Figure 6:
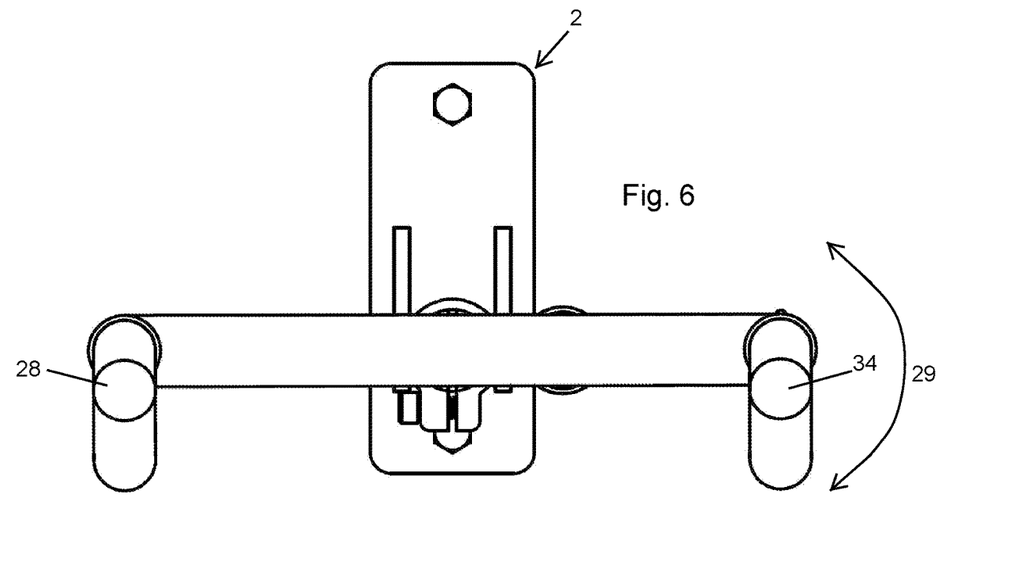
FIG. 6 is a front view of the bicycle rack and having frame support prongs in a parallel orientation.

FIG. 6 illustrates a front view of the orientation of the bicycle rack of FIG. 1. Arrow 29 illustrates the rotation or swiveling movement of the frame support prongs and U-Shaped support tube relative to the main support tube 16 and the baseplate 4.

Figure 7:
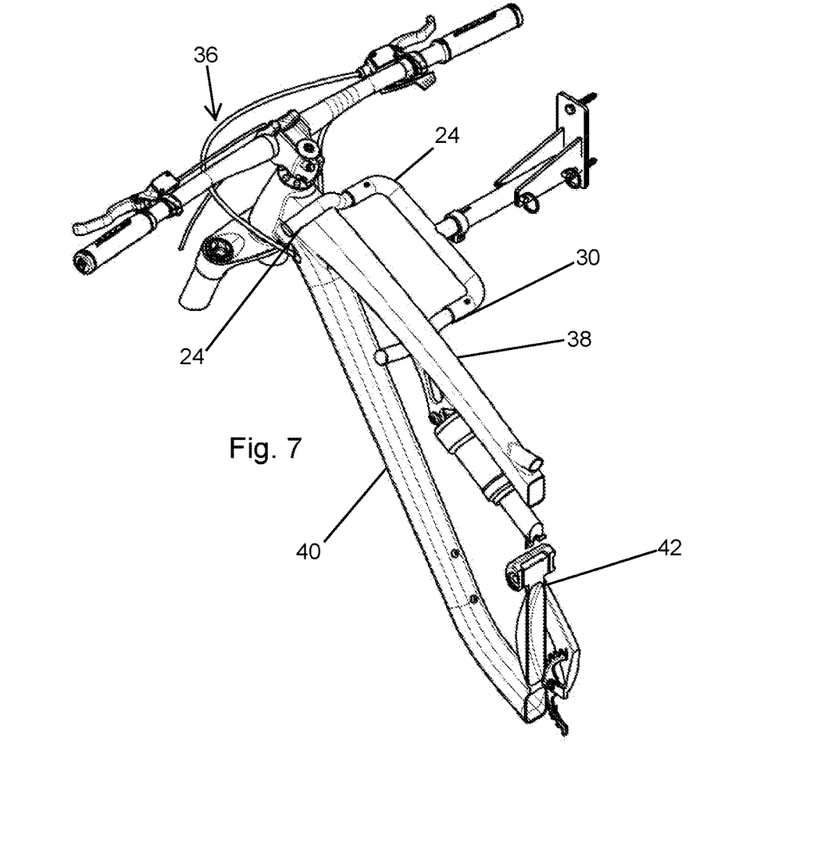
FIG. 7 is a perspective view of a partial bicycle rack having the top tube of the bicycle rack held by a bicycle rack having frame support prongs in an opposing orientation.

FIG. 7 illustrates the bicycle rack of FIG. 1 with the frame support prongs and U-Shaped support tube in a diagonal orientation to retain a bicycle frame. The top tube 38 of the bicycle frame 36 is positioned between the frame support prongs. The left frame support prong 24 has been inverted from the positioning shown in FIG. 1. The weight of the bicycle frame causes a downward force on the first frame support prong 30 causing the bicycle to provide a rotational force on the frame causing an upward force against frame support prong 24. The forces are countered by each frame support prong providing a stable mounting position of the bicycle in the bicycle rack. FIG. 7 illustrates the bicycle frame having a main triangle 38 formed by top tube 38, bottom tube 40, and rear vertical tube 42.

Figure 8:
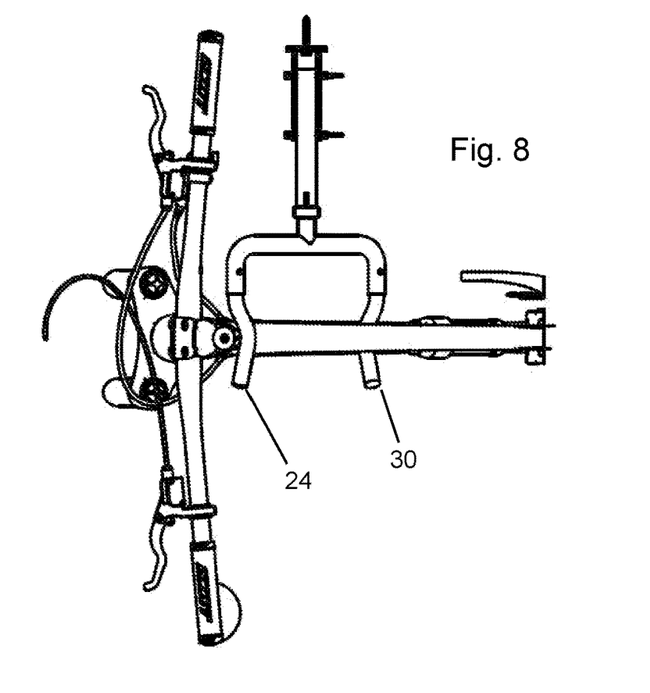
FIG. 8 is a top isometric view of the bicycle rake and bicycle frame of FIG. 7.
Figure 9:
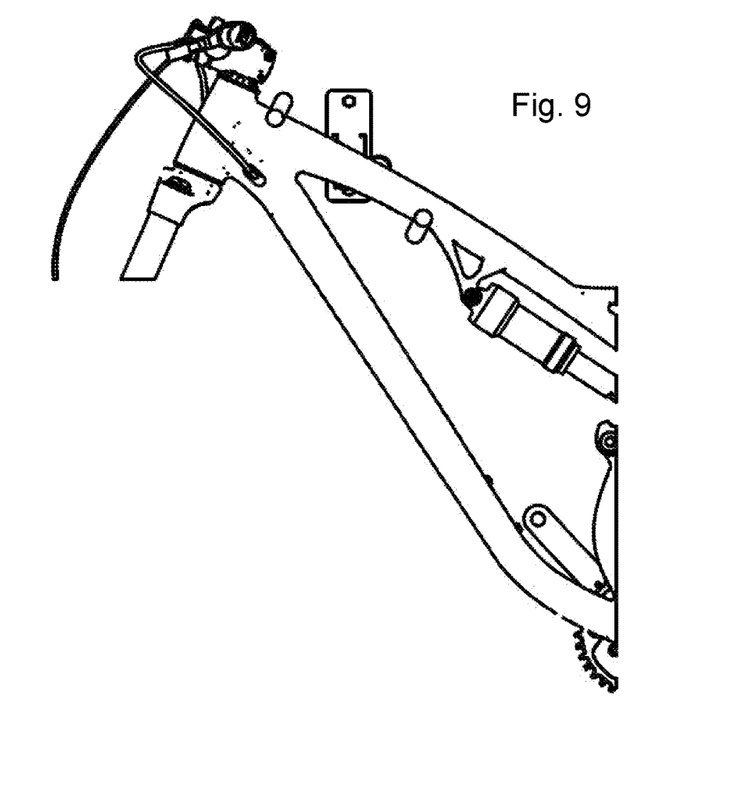
FIG. 9 is a an isometric view of the bicycle frame and bicycle rack of FIGS. 7-8.

FIG. 8 shows a top view of the rack and frame of FIG. 7. FIG. 8 illustrates one frame support prong 24 positioned over the top of the top tube of the bicycle frame and second frame support prong 30 positioned below the top tube of the bicycle frame. FIG. 9 shows a front view of the bicycle frame and bicycle rack of FIGS. 7-8.

Figure 10:
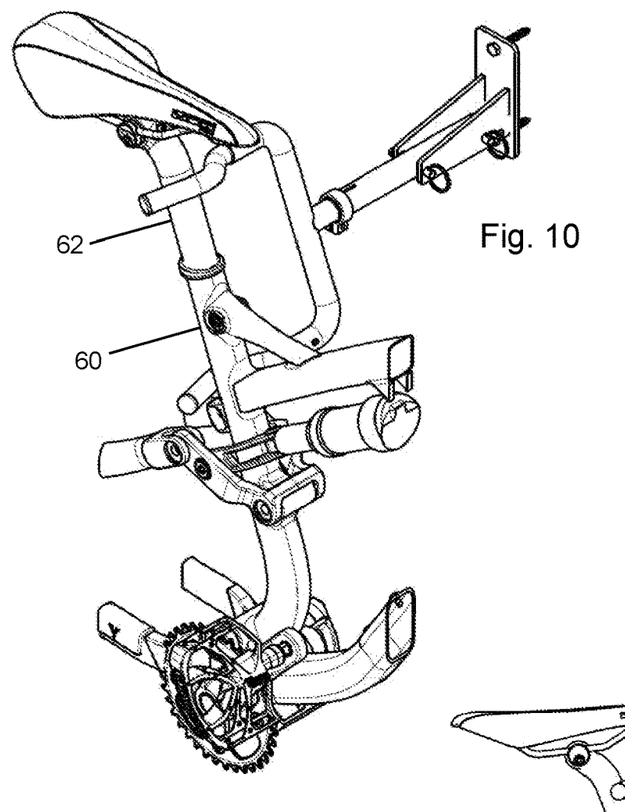
FIG. 10 is a perspective view of the bicycle rack holding a vertical oriented tube of a bicycle frame.
Figure 11:
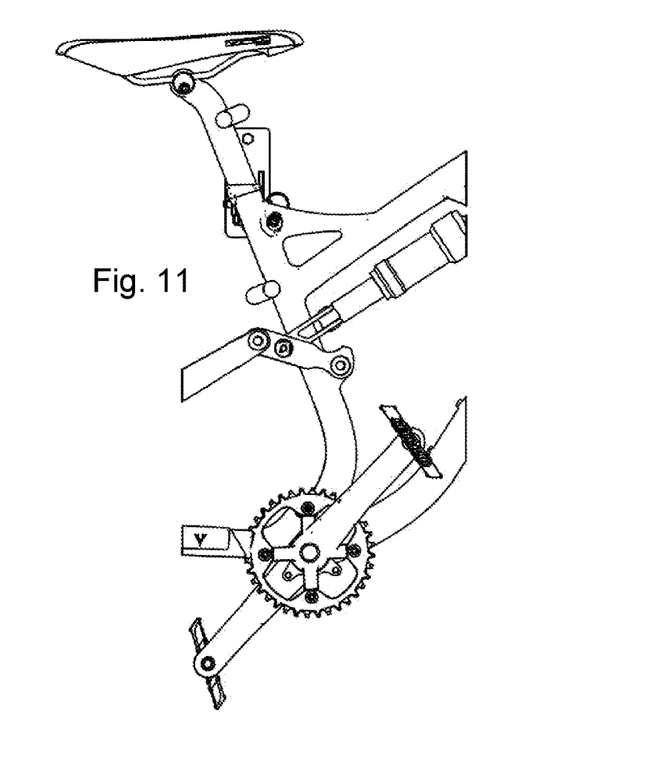
FIG. 11 is a front view of the bicycle rack and frame orientation of FIG. 10.

FIG. 10 illustrates the bicycle rack retaining a generally vertical frame tube 60 and seat post tube 62 of a bicycle frame. The weight of the bicycle provides opposing forces on the frame support prongs of the bicycle rack to stabilize the bicycle frame in the rack to provide an upright positioning of the bicycle in the bicycle rack. The U-shaped support tube is at a slight angle, illustrating the versatility provided with the swiveling U-shaped support tube. FIG. 11 illustrates a front view of the bicycle frame and bicycle rack of FIG. 11.

Figure 12:
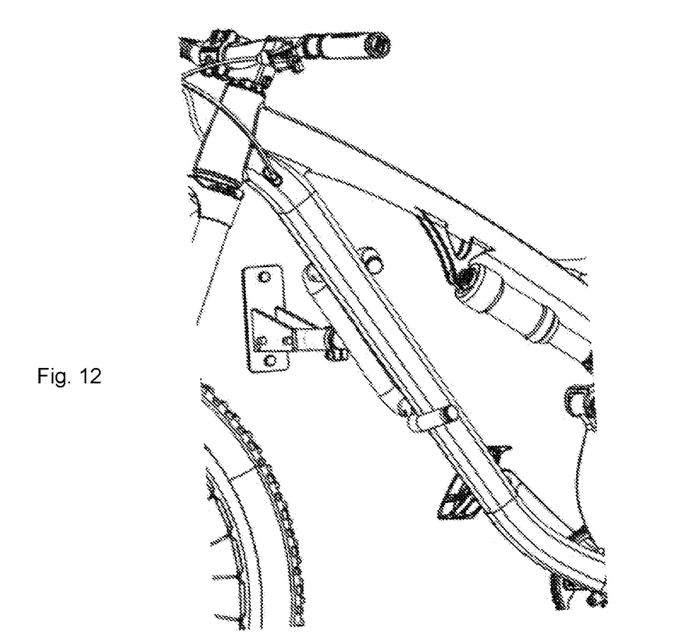
FIG. 12 is a perspective view of a bicycle frame supported by a bicycle rack by the bottom tube of the bicycle frame.
Figure 13:
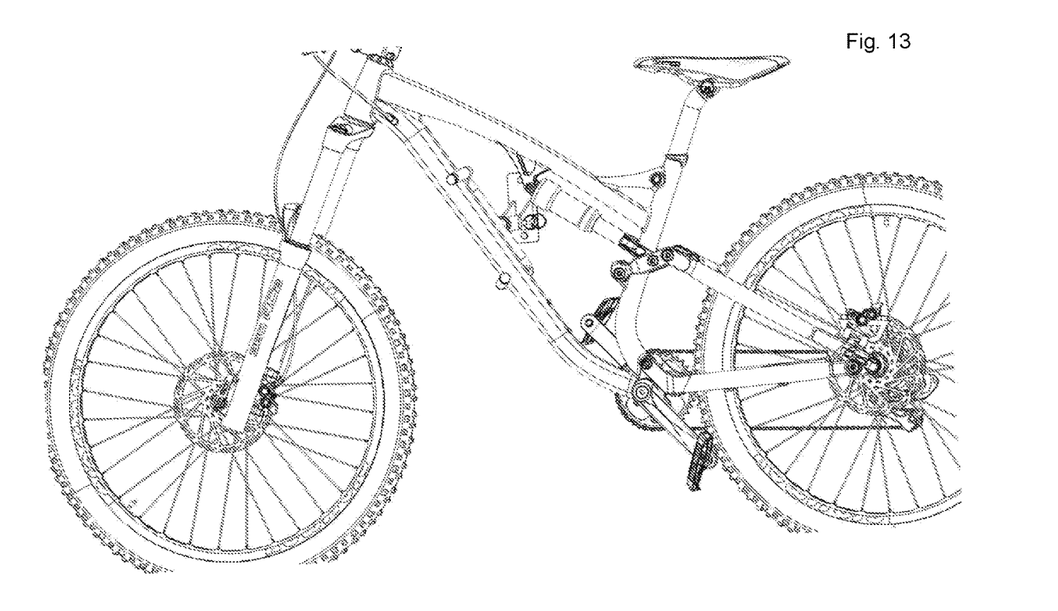
FIG. 13 is a second perspective view of a bicycle frame supported by a bicycle rack by the lower tube of the bicycle frame.

FIG. 12 illustrates the bicycle rack supporting the lower tube of the bicycle rack. FIG. 12 further illustrates the versatility of the bicycle rack utilizing the swiveling U-shaped support tube, coupled with the adjustable positioning support prongs. FIG. 13 shows a front view of the bicycle rack of and bicycle frame of FIG. 12.

While certain preferred embodiments are shown in the figures and described in this disclosure, it is to be distinctly understood that the presently disclosed inventive concept(s) is not limited thereto but may be variously embodied to practice within the scope of the following claims. For example, while the rack is described as a bicycle rack, other tubed objects can be retained in the bicycle rack, or alternatively other devices such as motorcycles may be retained in the rack. From the foregoing description, it will be apparent that various changes may be made without departing from the spirit and scope of the disclosure as defined by the following claims.

What is claimed is:

1. A bicycle rack, said bicycle rack comprising:
   a base bracket, wherein said base bracket is configured for mounting to a substrate;
   a base support tube, wherein said support tube attached to said base bracket;
   a U-shaped support bracket comprising two spaced apart parallel arms, wherein said U-shaped support bracket is attached to said base support tube by a swiveling support tube extending generally in an opposite direction to said spaced apart parallel arms, wherein said swiveling support tube is configured for swiveling engagement with said base support tube such that said U-shaped support bracket is configured for swiveling rotation relative to said base support tube;
   a tube lock configured to arrest rotation of said swiveling support tube relative to said base support tube;
   wherein said U-shaped support bracket comprising a pair of frame support prongs each attached to one of said two spaced apart parallel arms, with each of said opposing frame support prongs configured to support a tube of a bicycle frame, wherein said frame support prongs are rotationally adjustable relative to said U-shaped support bracket to provide opposing orientation of said frame support prongs to engage opposite sides of said tube of said bicycle frame, wherein said frame support prongs are configured to be rotationally fixed in said opposing orientation.

2. The bicycle rack of claim 1 wherein said frame support prongs are removably attached to said U-shaped support bracket.

3. The bicycle rack of claim 1 wherein said base support tube is connected to said base bracket by two pins comprising a rearward pin and a forward pin, wherein said base bracket support tube is configured to rotate on said forward pin when said rearward pin is removed.

4. The bicycle rack of claim 1 wherein said tube of said bike frame comprising an upper frame tube.

5. The bicycle rack of claim 1 wherein said tube of said bike frame comprising a seat tube.

6. The bicycle rack of claim 1 wherein said swiveling support tube is configured for mating engagement with said base support tube.

7. The bicycle rack of claim 1 wherein said base support tube comprises a female opening configured to receive said swiveling support tube.

8. The bicycle rack of claim 7 wherein said tube lock comprises a clamping collar.

* * * * *